(12) United States Patent
Ten-Jet-Foei et al.

(10) Patent No.: US 11,840,129 B2
(45) Date of Patent: Dec. 12, 2023

(54) ROOF SYSTEM HAVING A WIND DEFLECTOR ASSEMBLY

(71) Applicant: INALFA ROOF SYSTEMS GROUP B.V., Oostrum (NL)

(72) Inventors: Suyanto Teri Wahiyu Ten-Jet-Foei, Helmond (NL); Thomas Anton Martijnszoon Albers, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/833,343

(22) Filed: Jun. 6, 2022

(65) Prior Publication Data
US 2022/0396134 A1 Dec. 15, 2022

(30) Foreign Application Priority Data
Jun. 10, 2021 (EP) ..................................... 21178855

(51) Int. Cl.
*B60J 10/90* (2016.01)
*B60J 10/15* (2016.01)
(Continued)

(52) U.S. Cl.
CPC .................. *B60J 10/90* (2016.02); *B60J 7/04* (2013.01); *B60J 7/22* (2013.01); *B60J 10/15* (2016.02);
(Continued)

(58) Field of Classification Search
CPC ... B60J 10/00; B60J 10/15; B60J 10/16; B60J 10/20; B60J 10/23; B60J 10/24;
(Continued)

(56) References Cited

U.S. PATENT DOCUMENTS

| 4,676,546 A | 6/1987 | Igel | |
|---|---|---|---|
| 2010/0231008 A1* | 9/2010 | Bergmiller | B60J 7/22 296/217 |
| 2010/0313486 A1* | 12/2010 | Kuribayashi | B60J 10/82 49/490.1 |

FOREIGN PATENT DOCUMENTS

| DE | 102004026834 B3 | 9/2005 |
|---|---|---|
| EP | 0681936 A1 | 11/1995 |

(Continued)

OTHER PUBLICATIONS

Sawada, "Deflector Device for Vehicle", Published: Oct. 5, 2006, Publisher: Japanese Patent Office, Edition: JP2006264643A (Year: 2006).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

A roof system for a vehicle comprises a wind deflector member including a wind deflector body which extends in a transverse direction of the vehicle that is movable between a retracted position below a fixed roof and an extended position at least partly above the fixed roof. Wind deflector arms at the lateral ends of the wind deflector body extend substantially in a rearward direction and are at least rotatably connected to a stationary part. A sealing arrangement comprises a first seal is positioned between the wind deflector body and a panel that seals a gap between an the wind deflector body and the panel in its closed position. The first seal is configured to close a gap between the wind deflector arms and the panel. A second seal is closes a gap between the wind deflector member and the stationary part when the panel is in its closed position.

19 Claims, 8 Drawing Sheets

(51) Int. Cl.
  *B60J 10/23* (2016.01)
  *B60J 10/24* (2016.01)
  *B60J 10/50* (2016.01)
  *B60J 7/04* (2006.01)
  *B60J 7/22* (2006.01)
  *B60J 10/82* (2016.01)
  *B60J 7/043* (2006.01)

(52) U.S. Cl.
  CPC .............. *B60J 10/23* (2016.02); *B60J 10/24* (2016.02); *B60J 10/50* (2016.02); *B60J 7/043* (2013.01); *B60J 10/82* (2016.02)

(58) Field of Classification Search
  CPC ... B60J 10/50; B60J 10/80; B60J 10/90; B60J 7/04; B60J 7/043; B60J 7/22; B60Y 2306/90
  USPC .... 296/216.01, 216.07, 216.08, 216.09, 217; 49/475.1, 489.1, 498.1
  See application file for complete search history.

(56) References Cited

FOREIGN PATENT DOCUMENTS

| | | | | |
|---|---|---|---|---|
| GB | 2168937 A | | 7/1986 | |
| GB | 2175347 A | * | 11/1986 | ............... B60J 7/22 |
| JP | 2006264643 A | * | 10/2006 | |
| KR | 20200077644 A | | 7/2020 | |

OTHER PUBLICATIONS

European Search Report in corresponding European patent application No. 21178855.9 dated Nov. 9, 2021.

* cited by examiner

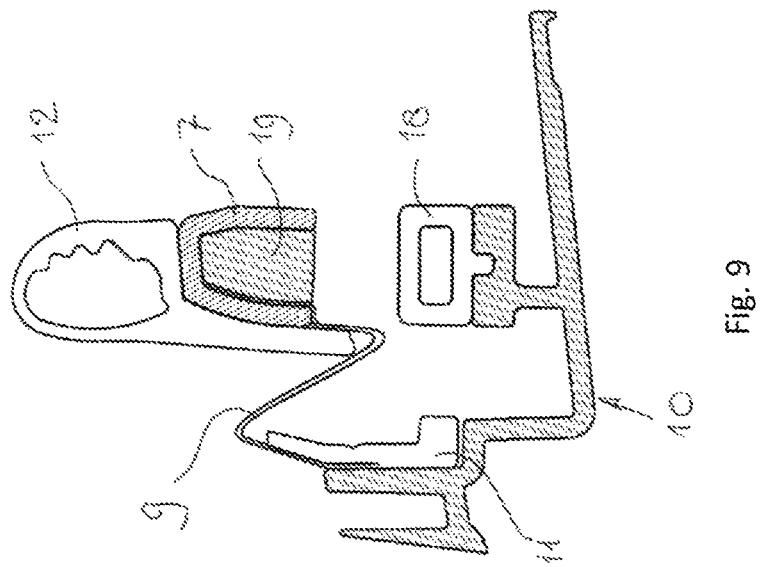
Fig. 9
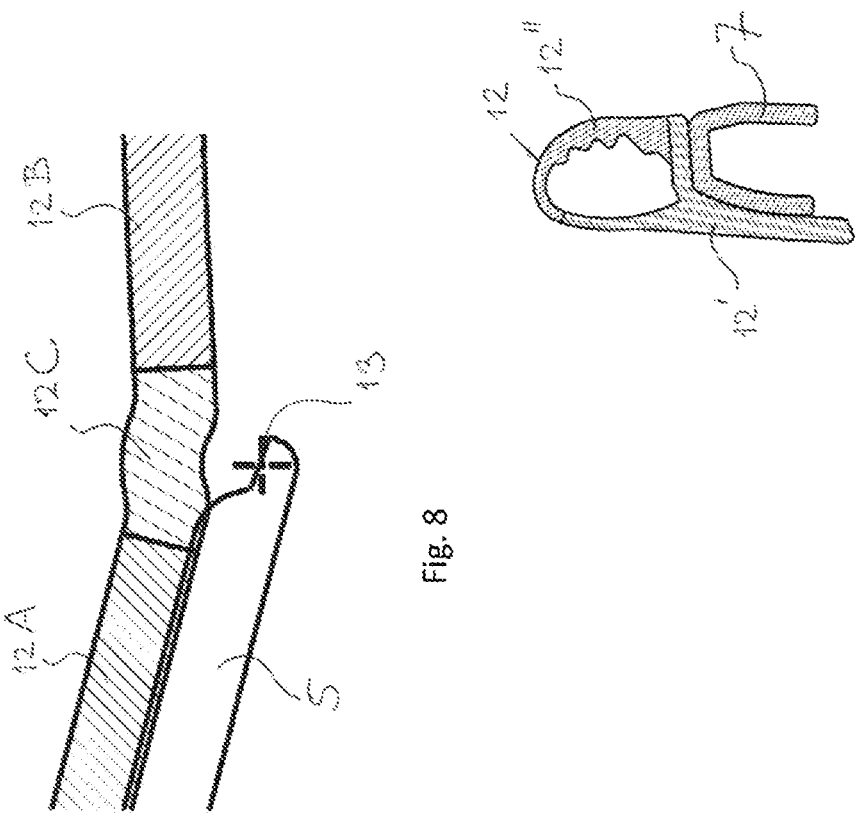
Fig. 8
Fig. 10

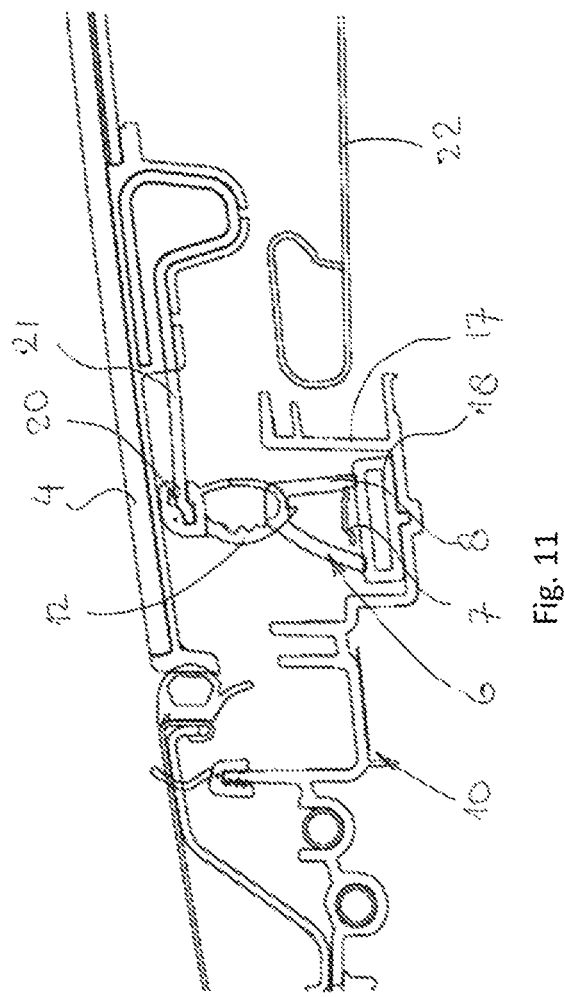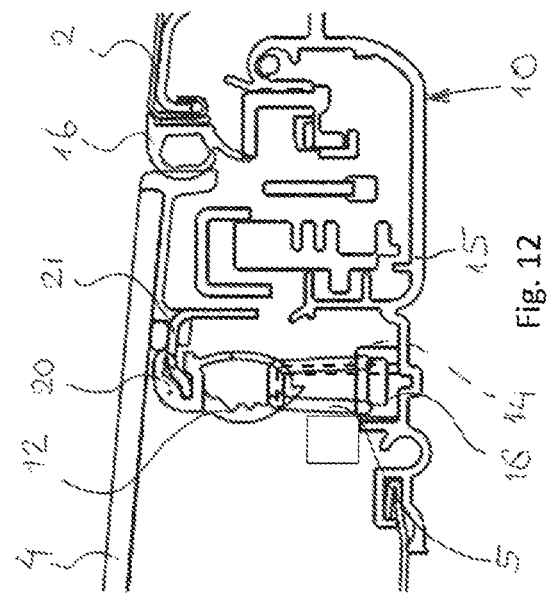

ROOF SYSTEM HAVING A WIND DEFLECTOR ASSEMBLY

BACKGROUND

The discussion below is merely provided for general background information and is not intended to be used as an aid in determining the scope of the claimed subject matter.

The invention relates to a roof system for a vehicle having a roof opening in its fixed roof, comprising a stationary part configured to be attached to the fixed roof, a panel movably supported on the stationary part and configured to close the roof opening in its closed position and to be moved at least rearwardly to an opened position in which the roof opening is at least partly opened, a wind deflector assembly arranged at a front of the roof opening and comprising a wind deflector member including a wind deflector body which extends in a transverse direction of the vehicle and which is movable between a retracted position below the fixed roof and an extended position at least partly above the fixed roof, the wind deflector member further including wind deflector arms at the lateral ends of the wind deflector body, which extend substantially in rearward direction and are movably, in particular at least rotatably connected to the stationary part, and a sealing arrangement comprising a first seal which is positioned between the wind deflector body and the panel and which seals a gap between an upper side of the wind deflector body and a lower side of the panel when the panel is in its closed position In a prior art roof system, the first seal is primarily meant for sealing a gap between the wind deflector body and the panel when the panel is moving from and to the closed position in order to prevent unwanted noises when air from the wind is flowing through this gap.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

It is one of the objects to provide an improved roof system having a wind deflector assembly in which driving wind noise is especially decreased when the panel is closed.

An aspect of the invention is that in the roof system described above, the first seal is extended such that it is also positioned between the wind deflector arms and the panel when the panel is in its closed position and is configured to close a gap between an upper side of the wind deflector arms and the lower side of the panel. A second noise barrier, preferably a second seal, which is positioned between the wind deflector member and the stationary part and closes a gap between the wind deflector member and the stationary part when the panel is in its closed position.

Due to the extended first seal and the added second noise barrier, e.g., second seal, no noise from the (seal at the) front of the panel can enter the interior of the vehicle. By using the wind deflector member to be included in the noise insulating arrangement, room can be saved in front of or besides the wind deflector member thereby reducing the size of the roof system and thus making it possible to increase head room for the passengers in the vehicle, which is especially important in electric vehicles which are preferably provided with a low profile to increase driving range.

The first seal may either be attached to the wind deflector member and/or to the lower side of the panel.

If each wind deflector arm is provided with a pivot axis to rotatably connect the wind deflector arm to the stationary part, the first seal is preferably further extended so that it is positioned above the pivot axis and above the stationary part which is aligned with the respective wind deflector arm, preferably up to a position at least near the rear end of the roof opening, in the closed position of the panel.

Due to this further extension of the first seal, driving noise coming through the panel seal is further reduced. If possible, the first seal could be extended all around the panel, but often a sunshade arrangement at the rear of the panel will interfere. However, when using an electrochromic panel, a separate sunshade arrangement may be omitted.

The first seal may be divided in length sections having a different cross section, in particular at the position above the wind deflector member and above the stationary part and possibly also above the wind deflector pivot axis, when the panel is in the closed position.

As a result of these length sections, the seal can be conveniently adapted to the local requirements.

The first seal may at least partly take the form of a hollow bulb seal, as this will easily compensate for tolerances in the gap below the panel.

A disadvantage of such hollow bulb seal may be that it may deform under wind load at higher speeds thereby possibly affecting the noise reducing properties of the wind deflector. To reduce the deformation of the hollow bulb seal of the first seal, at least a portion of the hollow bulb seal facing the front of the roof system may be strengthened or made more rigid to resist deformation under wind loads.

As an alternative or in addition, the hollow bulb seal may be filled with a foam material strengthening the first seal to resist deformation under wind loads.

In the embodiment in which the first seal is attached to the panel, the first seal is preferably attached to a flange of a reinforcement bracket or frame attached to a lower side of the panel. Such reinforcement frame will normally be adapted such that the first seal is attached rigidly on the one hand and is optimally positioned above the wind deflector member and optionally also above the stationary part of the roof system on the other hand.

The second seal may either be attached to a lower side of the wind deflector member, or to the stationary part at a position below the wind deflector member when the panel is in its closed position.

Generally, the gap between the wind deflector member and the stationary part when the panel is in its closed position will be relatively small, such that it is sufficient if the second seal is a solid seal.

Such gap will be reduced if the second seal is attached to or seals against an upper edge or upper surface of an upright flange on the stationary part.

BRIEF DESCRIPTION OF THE DRAWINGS

Hereinafter, aspects of the invention will be further elucidated while referring to the drawings, in which:

FIG. 8 is an enlarged sectional view along the line VIII-VIII in FIG. 2.

FIG. 9 shows detail IX-IX in FIG. 6 but in a slightly different embodiment.

FIG. 10 is a cross-section of the wind deflector member according to another embodiment.

FIGS. 11 and 12 are views corresponding to those of FIGS. 4 and 5 but showing an alternative embodiment.

DETAILED DESCRIPTION OF THE ILLUSTRATIVE EMBODIMENTS

Figure 1:
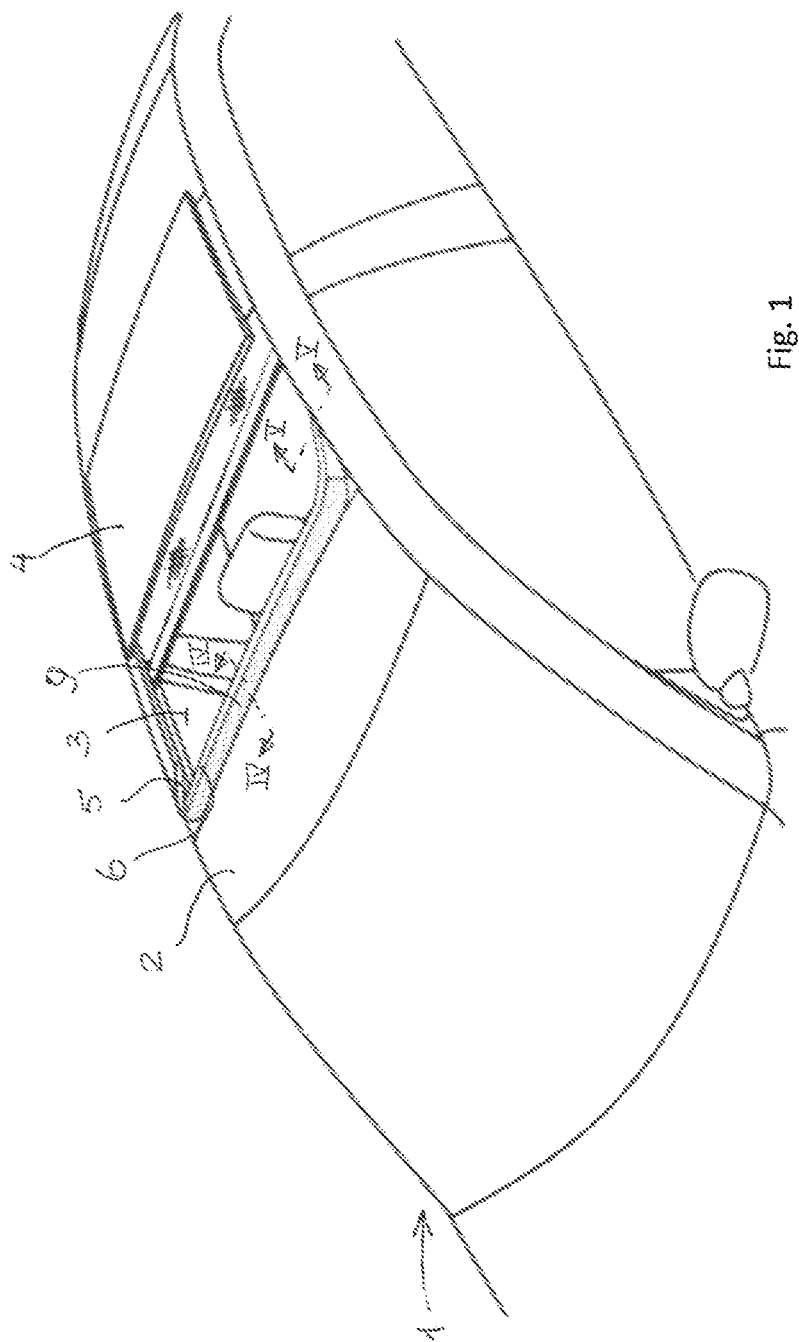
FIG. 1 is a schematic perspective view of a vehicle roof comprising the roof system and wind deflector assembly.
Figure 2:
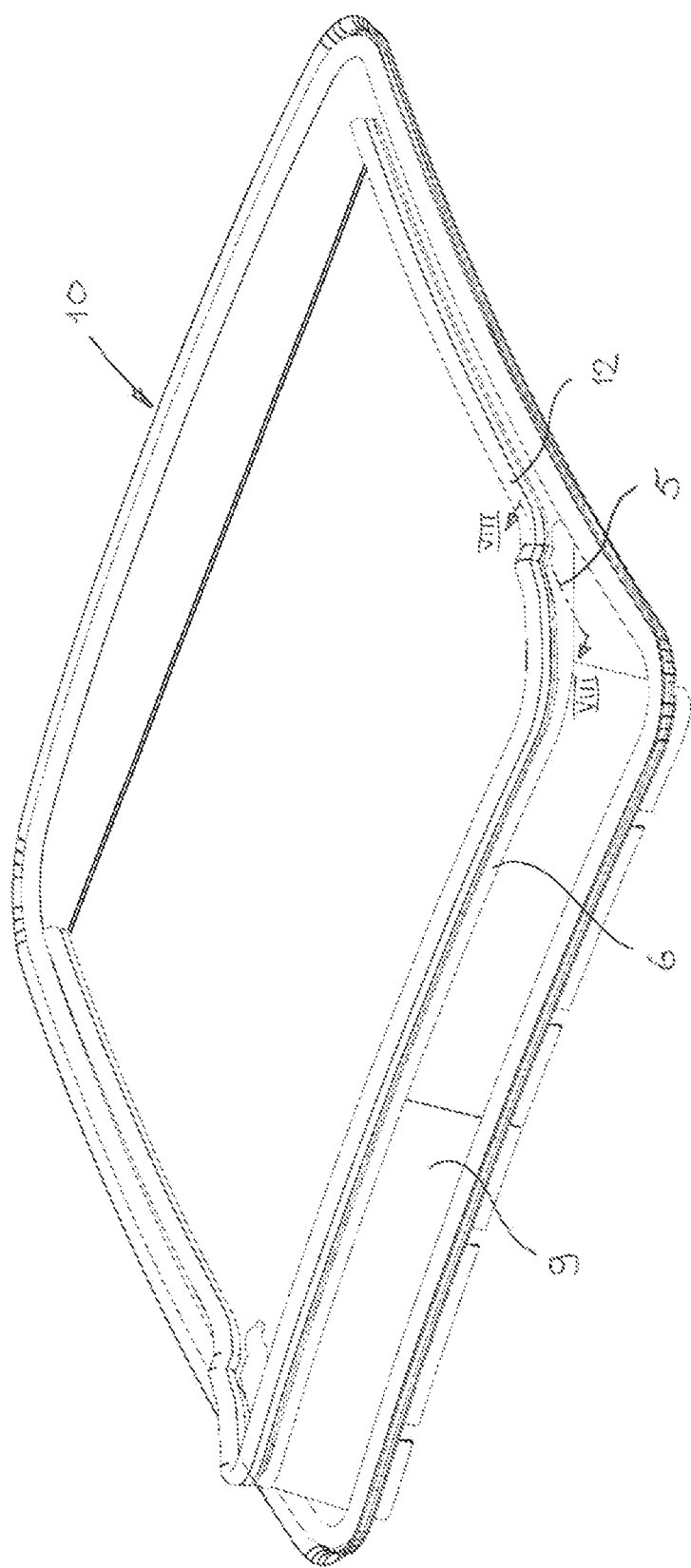
FIG. 2 is an enlarged perspective view of the roof system from FIG. 1.

Firstly referring to FIGS. 1 and 2, a roof system comprising a wind deflector assembly is schematically illustrated. In a fixed roof 2 of a vehicle 1 a roof opening 3 is defined which can be opened and closed by a movable closure, here a rigid, at least partly (semi)transparent panel 4, made of glass, plastic or the like. For influencing the flow pattern above the roof opening 3 when panel 4 is moved rearwardly above or below stationary roof part 2 (and thus for reducing disturbing noises and for preventing excessive wind entrance into the vehicle), at the front of the roof opening 3 a wind deflector assembly is positioned which extends in a transverse direction of the vehicle 1 and which is movable between a retracted position substantially below the fixed roof 2 (when panel 4 is closed) and an extended position extending at least partly above the fixed roof 2 in front of the roof opening 3 (when panel 4 is moved rearwardly).

The wind deflector assembly includes a wind deflector member comprising two pivotable wind deflector arms 5 connected by a transverse wind deflector body 6. In this embodiment, arms 5 and wind deflector body 6 have substantially the same cross section and include a steel strip base member 7 and a plastic beam 8 attached on base member 7. A flexible, in particular mesh, material 9 extends at least between wind deflector body 6 and a stationary part of the vehicle 1, i.e., a frame 10 or a holding member 11 attached to it. In the extended position of wind deflector member 6 (shown in dashed lines in FIG. 4) mesh material 9 is tensioned and air can flow through it, yielding a substantially turbulent flow pattern above roof opening 3. In the retracted position of wind deflector member 5, 6, mesh material 9 will be folded below and in front of the wind deflector body 6. The mesh material 9 may not only extend between wind deflector body 6 and frame 10, but also between at least a part of each arm 5 and frame 10.

Figure 3:
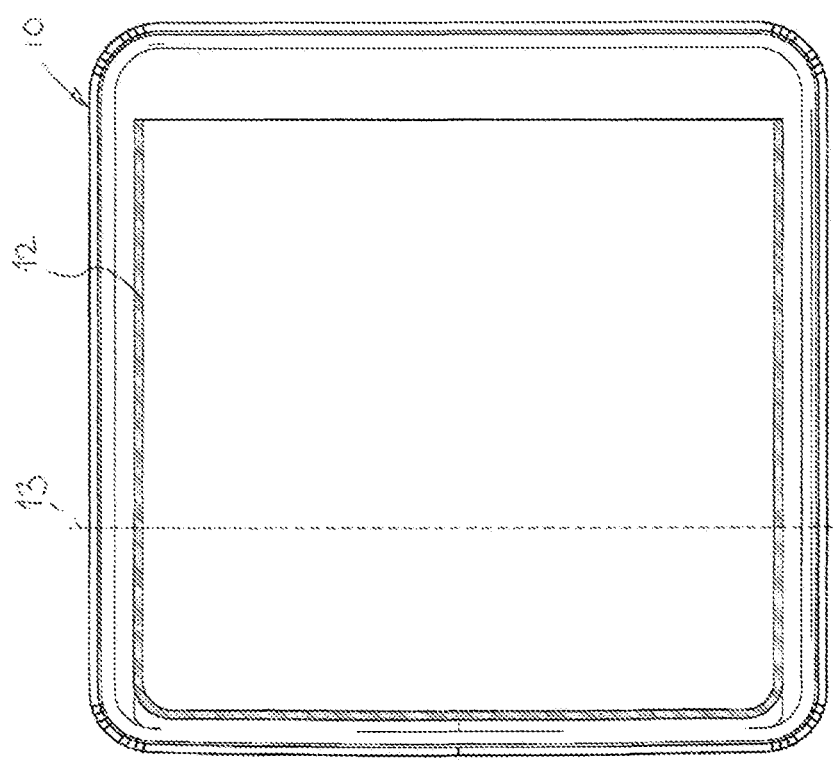
FIG. 3 is a plan view of the frame of the roof system of FIG. 2.
Figure 5:
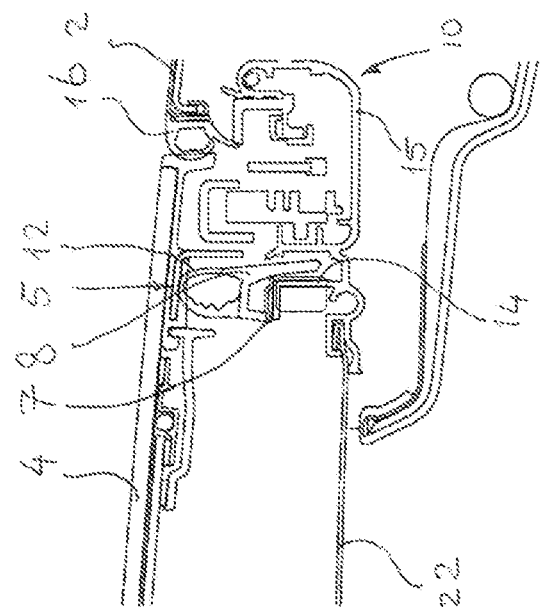
FIG. 5 is an enlarged sectional view along the line V-V in FIG. 1 although with the panel closed.
Figure 4:
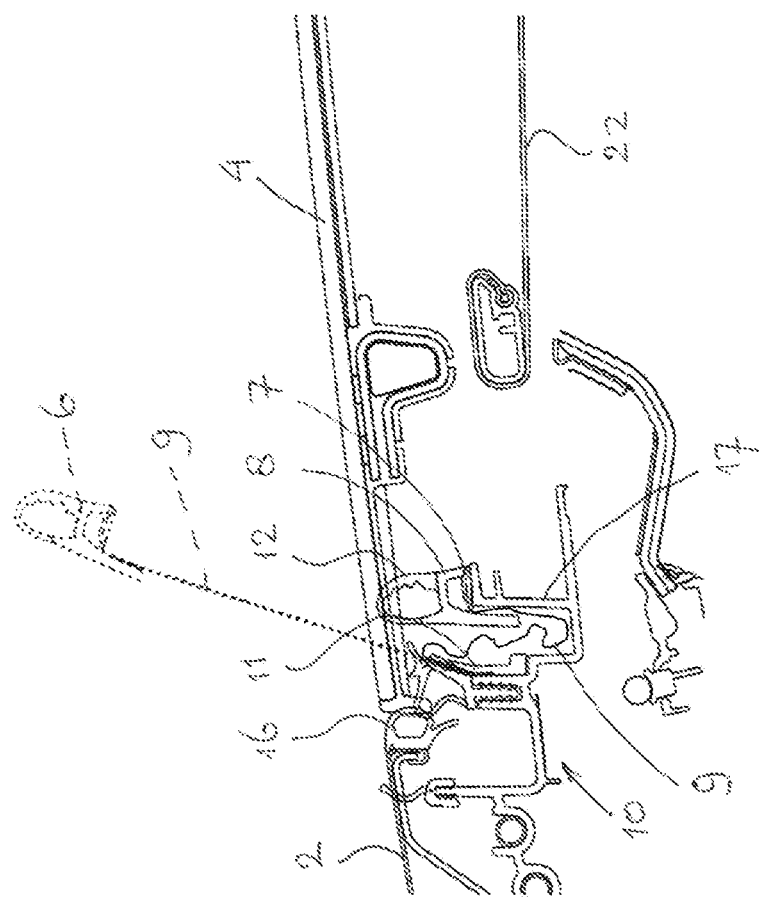
FIG. 4 is an enlarged sectional view along the line IV-IV in FIG. 1 although with the panel closed.

FIGS. 4 and 5 show that wind deflector member 5, 6 are provided with a first (bulb) seal 12 on top of beam 8 of wind deflector body 6 and arms 5. FIG. 3 shows that this first seal 12 is even extended further rearwardly beyond a transverse pivot axis 13 of arms 5 where first seal 12 is attached on frame 10, in this case an upright flange 14 of guide rail 15 extending in longitudinal direction of the roof system and of the vehicle behind transverse pivot axis 13 (see FIG. 5). This first seal 12 forms an acoustic barrier between the circumference of panel 4 where a panel seal 16 may leak or even cause noise and the interior of the vehicle.

On its lower side, the wind deflector member 5, 6, in particular the base member 7 thereof, closes against a front flange 17 and against said longitudinal flange 14 (in front of pivot axis 13) to form a second barrier against said noise that could enter the interior through any gap below the wind deflector member 5, 6. The barrier is particularly formed between the lower side of base member 7 and a horizontal upper portion of flange 14.

Figure 6:
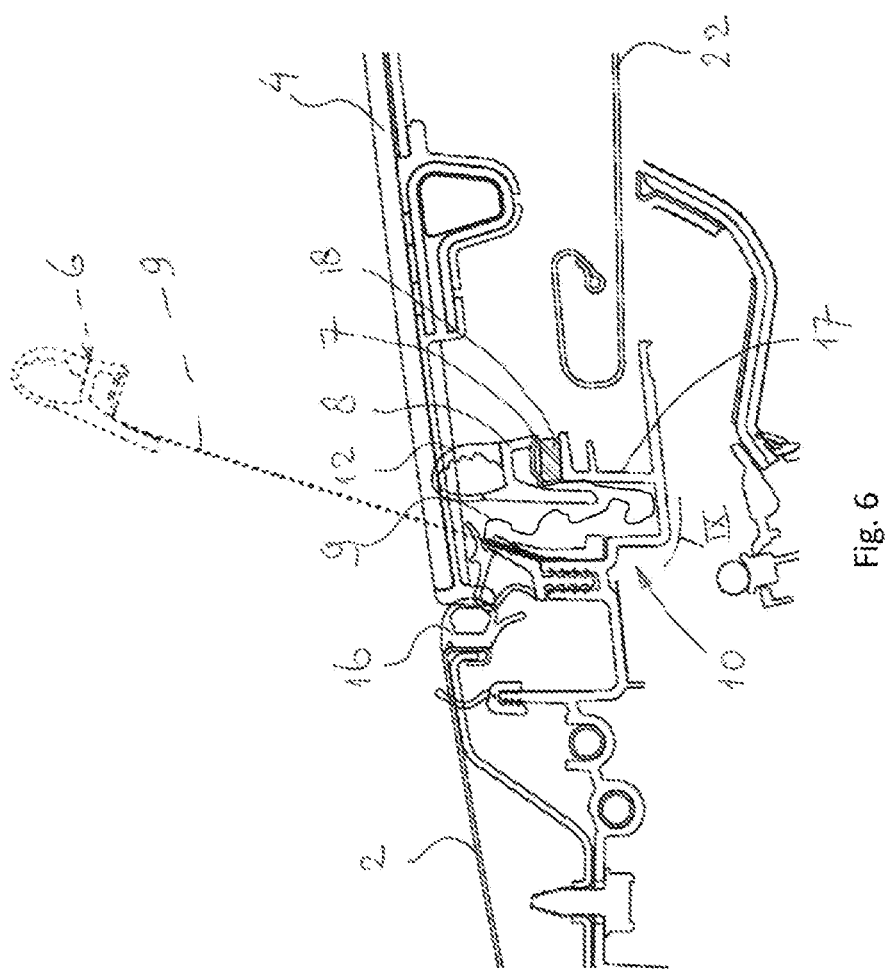
FIG. 6 is a sectional view corresponding to that of FIG. 4 but showing a different embodiment.

To improve this second barrier, FIG. 6 shows a second embodiment in which a second seal 18 enhances the noise barrier below wind deflector member 5, 6. This second seal 18 will be provided on (horizontal portion of) transverse front flange 17 and on longitudinal flange 14 and extends continuously on the front and sides of frame 10, as is shown in FIG. 2. It seals against the lower side of base member 7 of wind deflector member 5, 6. Such second seal 18 could also be fixed to base member 7 (or beam 8) and seal against flanges 14, 17.

Figure 7:
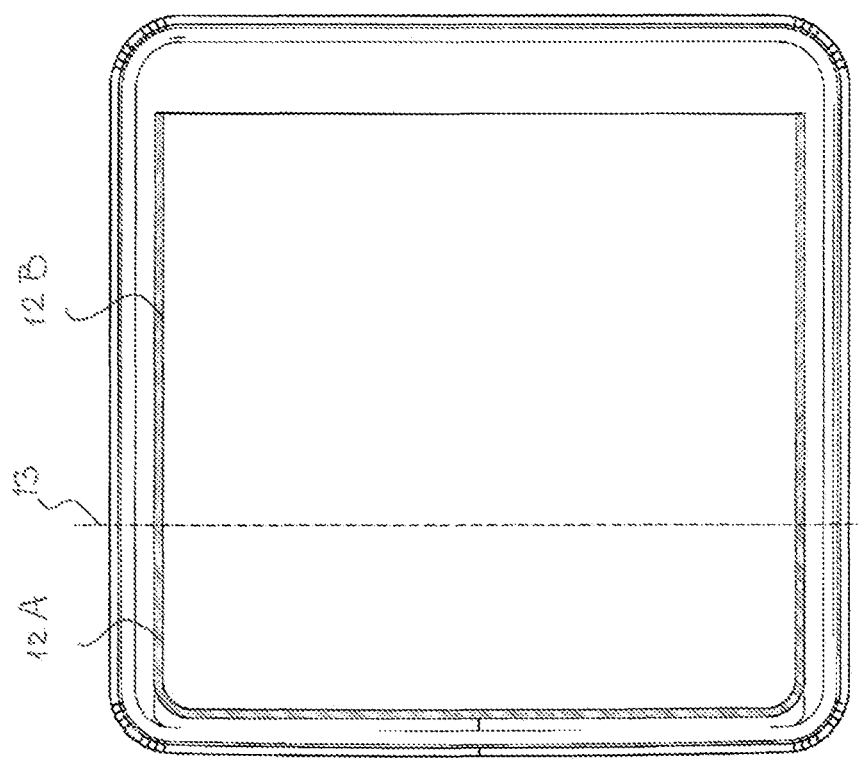
FIG. 7 is a plan views corresponding to that of FIG. 3 but showing the embodiment of FIGS. 4 and 5.

FIG. 7 shows very schematically a slightly improved embodiment with respect to the embodiment of FIG. 3. In fact, only the hatching of first seal 12 is different. In FIG. 3 the hatching is continuous, meaning that first seal 12 is continuous all along its length. In FIG. 7, the hatching changes at the position of transvers pivot axis 13 meaning that first seal portion 12A left of pivot axis 13, so on the upper side of wind deflector member 5, 6, is different from first seal portion 12B which is fixed to flange 14 of guide rail 15 (see FIGS. 4 and 5). The difference may relate to the cross sections of the seal portions, but also to the materials used, for example. Both seal portions 12A, 12B will be attached to each other such that the sealing effect is continuous.

FIG. 8 schematically shows a further embodiment in which a first seal portion 12C positioned above pivot axis 13 connects both seal portions 12A, 12B. In this way seal 12 can be adapted to its specific position. For example, at the position of pivot axis 13 first seal portion 12C should be easily bendable and adaptable to different orientations.

FIG. 9 shows an embodiment in which base member 7 is formed differently. It is shaped as a U upside down and includes an inner body 19 which is used to clamp the upper side of mesh material 9 to wind deflector member 5, 6. Second seal 18 is now hollow (at least in portion 12A).

In the embodiment of FIG. 10, first seal 12, especially the bulb thereof, is now formed in two parts from two different materials. First seal base part 12', forming the base and front facing part of first seal 12, is formed from a relatively rigid rubber-like or plastic material, while first seal upper part 12" is made from softer rubber-like material. Relatively rigid base part 12' prevents deformation of first seal 12 when vehicle 1 is driving with high speed and open panel 4. The shape of first seal 12 is designed to prevent unwanted wind noises and a deformation of first seal 12 could affect the function of first seal 12, so preventing such deformation is beneficial. Additionally, or alternatively, first seal portion 12A may also be filled with foam to prevent deformation under wind load.

FIGS. 11 and 12 show another embodiment in which first seal is not attached to wind deflector member 5, 6 and to flange 14 of guide rail 15, but to panel 4. It is now turned upside down and seals against (the upper side of) wind deflector member 5, 6 and to (the upper horizontal flange part of) flange 14. In this embodiment, seal 12 is provided with an attachment part 20, with which seal 12 is attached, e.g., clipped or clamped, to a (flange of) reinforcement bracket or frame 21 below panel 4. Generally, such reinforcement bracket 21 extends all around panel 4 so that it is very well suited to hold first seal 12. Probably only the shape of reinforcement bracket 21 must be adapted to allow attachment of first seal 12 in the correct position. As first seal will not be positioned directly in the air flow of the wind when vehicle 1 is driving, there is no need to make first seal rigid to prevent deformation at high speeds. In this embodiment, second seal 18 is not attached on top of front flange 17 or flange 14, but to the bottom of frame 10. Second seal 18 could also be attached to the lower side of wind deflector member 5, 6 and seal against flanges 14, 17, frame 10 or any other stationary part positioned below wind deflector member 5, 6.

Figure 13:
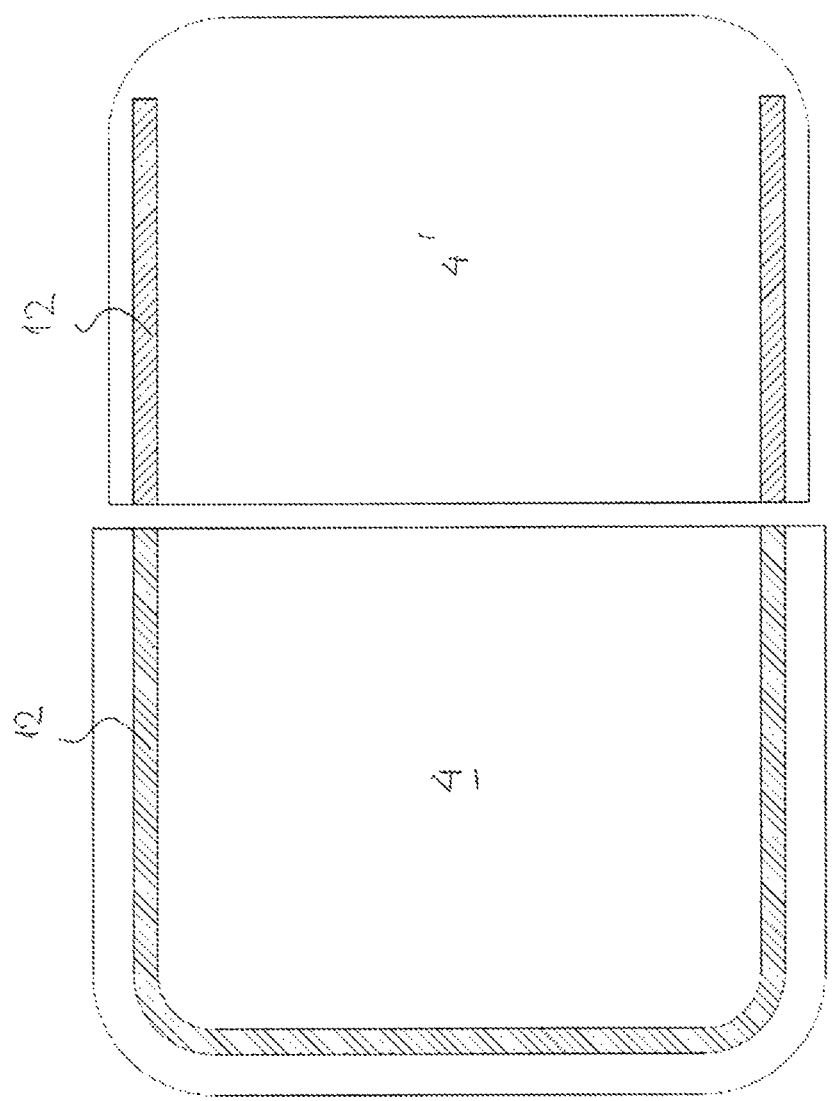
FIG. 13 is a bottom view of the panel of FIGS. 11 and 12 together with a second panel positioned behind it.

FIG. 13 shows panel 4 from below, together with a second panel 4' positioned behind panel 4 and fitted with a first seal 12 as well. If winding rollers of windable sunscreens are positioned at the rear end of panel 4 and at the front end of rear panel 4' first seal 12 could also extend along the rear side of panel 4'.

From the above it becomes clear that the invention provides a roof system comprising a wind deflector assembly in which noise leaking through the panel seal at the front and sides of the panel are effectively blocked by the first and second seal. If the roof system lacks a windable sunscreen 22, for example with electrochromic panels or panels with built-in sunshades, such first seal could be provided all around the panel (or all around the frame), thereby providing an even further improved noise barrier.

The invention is not limited to the embodiments described before and shown in the drawings which may be varied widely within the scope of the invention as defined by the appended claims. In principle, it would be possible to combine features of the various embodiments shown and described. A closure part engaging the wind deflector arm may either be attached directly to the closure, or may be moving with it, for example if it is attached to the operating mechanism for the closure. In case of the first seal being fixed to the upper side of the wind deflector arm, the arm may be provided with a lateral flange or the like adapted to be engaged by the closure part. Instead of or in addition to the transparent panel, the closure may also include e.g., a foldable cover, slats or a non-transparent panel.

The invention claimed is:

1. A roof system for a vehicle having a roof opening in its fixed roof, comprising:
    a stationary part configured to be attached to the fixed roof;
    a panel movably supported on the stationary part and configured to close the roof opening in its closed position and to be moved at least rearwardly to an opened position in which the roof opening is at least partly opened;
    a wind deflector assembly arranged at a front of the roof opening and comprising a wind deflector member including a wind deflector body which extends in a transverse direction of the vehicle and which is movable between a retracted position below the fixed roof and an extended position at least partly above the fixed roof, the wind deflector member further including wind deflector arms at lateral ends of the wind deflector body, which extend substantially in a rearward direction;
    a sealing arrangement comprising:
        a first seal which is positioned between the wind deflector body and the panel and which seals a gap between an upper side of the wind deflector body and a lower side of the panel when the panel is in its closed position, wherein the first seal is extended such that it is also positioned between the wind deflector arms and the panel when the panel is in its closed position and is configured to close a gap between an upper side of the wind deflector arms and the lower side of the panel; and
        a noise barrier, which is positioned between the wind deflector member and the stationary part and closes a gap between the wind deflector member and the stationary part when the panel is in its closed position.

2. The roof system according to claim 1, wherein the first seal is attached to the wind deflector member.

3. The roof system according to claim 1, wherein the first seal is attached to the lower side of the panel.

4. The roof system according to claim 2, wherein each wind deflector arm is provided with a pivot axis to rotatably connect the wind deflector arm to the stationary part, and wherein the first seal is further extended so that it is positioned above each pivot axis and above the stationary part which is aligned with the respective wind deflector arm.

5. The roof system according to claim 4, wherein the first seal is extended up to a position at least near a rear end of the roof opening, in the closed position of the panel.

6. The roof system according to claim 5, wherein the first seal is divided in length portions having a different cross section.

7. The roof system according to claim 6, wherein the first seal has different cross-sections at the position above the wind deflector member and above the stationary part and also above the wind deflector pivot axes, when the panel is in the closed position.

8. The roof system according to claim 1, wherein the first seal is at least partly a hollow bulb seal.

9. The roof system according to claim 8, wherein at least a portion of the hollow bulb of the first seal facing the front of the roof system is strengthened to resist deformation under wind loads.

10. The roof system according to claim 8, wherein the hollow bulb seal of the first seal is filled with a foam material strengthening the first seal to resist deformation under wind loads.

11. The roof system according to claim 3, wherein the first seal is attached to a flange of a reinforcement frame attached to a lower side of the panel.

12. The roof system according to claim 1, wherein the noise barrier is a second seal.

13. The roof system according to claim 12, wherein the second seal is attached to a lower side of the wind deflector member.

14. The roof system according to claim 12, wherein the second seal is attached to the stationary part at a position below the wind deflector member when the panel is in its closed position.

15. The roof system according to claim 12, wherein the second seal is one of a solid seal and a hollow seal.

16. The roof system according to claim 14, wherein the second seal is attached to an upright flange on the stationary part.

17. The roof system according to claim 14, wherein the second seal seals against an upright flange on the stationary part.

18. The roof system according to claim 1 wherein the wind deflector arms are movably connected to the stationary part.

19. The roof system according to claim 18 wherein the wind deflector arms are at least rotatably connected to the stationary part.

\* \* \* \* \*